United States Patent
Xiao et al.

(10) Patent No.: US 11,526,379 B2
(45) Date of Patent: Dec. 13, 2022

(54) APPLICATION BUILDING IN A DISTRIBUTED COMPUTING ENVIRONMENT

(71) Applicant: International Business Machines Corporation, Armonk, NY (US)

(72) Inventors: Ping Xiao, Changping (CN); Peng Hui Jiang, Beijing (CN); Xin Peng Liu, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 16/446,180

(22) Filed: Jun. 19, 2019

(65) Prior Publication Data
US 2020/0401447 A1    Dec. 24, 2020

(51) Int. Cl.
G06F 9/46    (2006.01)
G06F 9/50    (2006.01)
G06F 9/445    (2018.01)
G06F 8/20    (2018.01)
G06F 8/30    (2018.01)

(52) U.S. Cl.
CPC .................. *G06F 9/50* (2013.01); *G06F 8/20* (2013.01); *G06F 8/30* (2013.01); *G06F 9/44505* (2013.01); *G06F 9/468* (2013.01)

(58) Field of Classification Search
CPC ..... G06F 9/50; G06F 8/20; G06F 8/30; G06F 9/44505; G06F 9/468
See application file for complete search history.

(56) References Cited

U.S. PATENT DOCUMENTS

| | | |
|---|---|---|
| 5,488,727 A | 1/1996 | Agrawal |
| 5,583,988 A | 12/1996 | Crank |
| 6,427,234 B1 | 7/2002 | Chambers |
| 7,725,885 B1 | 5/2010 | Pradhan |
| 8,566,819 B2 | 10/2013 | Wookey |
| 8,739,138 B2 | 5/2014 | Ramidi |
| 9,342,298 B2 | 5/2016 | Wang |

(Continued)

FOREIGN PATENT DOCUMENTS

WO    9917191 A2    4/1999

OTHER PUBLICATIONS

Anonymous, "A method to resolve compile time and runtime inconsistency," IP.com, Disclosure No. IPCOM000254380D, Jun. 25, 2018, 3 pages. <https://priorart.ip.com/IPCOM/000254380>.

(Continued)

*Primary Examiner* — Tammy E Lee
(74) *Attorney, Agent, or Firm* — Kimberly Zillig

(57) ABSTRACT

Embodiments of the present disclosure relate to a method for building an application. According to the method, a request is received from a building environment to acquire at least one component for executing at least one function of at least one feature of the application. The at least one feature is to be deployed to at least one target node in a distributed service platform comprising a plurality of nodes. The at least one target node and the at least one component are determined based on the request. The at least one component is acquired from the at least one target node. The at least one component is sent to the building environment for building the at least one feature.

13 Claims, 6 Drawing Sheets

(56) References Cited

U.S. PATENT DOCUMENTS

| | | |
|---|---|---|
| 9,558,017 B2 | 1/2017 | Plate |
| 2015/0082298 A1 | 3/2015 | Wang |
| 2016/0026519 A1 | 1/2016 | Lupu |
| 2016/0170743 A1* | 6/2016 | Shmulevich .............. G06F 8/30 717/120 |
| 2018/0359336 A1* | 12/2018 | Chattopadhyay ..... G06F 9/5005 |
| 2020/0387361 A1* | 12/2020 | Modeel ..................... G06F 8/61 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

APPLICATION BUILDING IN A DISTRIBUTED COMPUTING ENVIRONMENT

BACKGROUND

The present disclosure relates to application building, and more specifically, to methods, systems and computer program products for building an application in a distributed computing environment.

Currently, a distributed computing system usually is hosted in a cloud computing system crossing various nodes and shares resources to achieve efficiency in a converged infrastructure. A distributed computing system can support, for example, Platform as a service (PaaS) that provides a computing platform (e.g., hardware architecture and software framework) and a solution stack (e.g., operating system, web server, database, and programming language) in a service model of cloud computing. In this service model, the provider manages or controls an underlying cloud infrastructure including networks, servers, operating systems, or storage. The consumer has control over deployed applications and configuration settings. An application feature may have a dependency on third party software components.

SUMMARY

Embodiments of the present disclosure disclose methods, systems and computer program products. According to some embodiments of the present disclosure, a request is received from a building environment to acquire at least one component for executing at least one function of at least one feature of the application. The at least one feature is to be deployed to at least one target node in a distributed service platform comprising a plurality of nodes. The at least one target node and the at least one component are determined based on the request. The at least one component is acquired from the at least one target node. The at least one component is sent to the building environment for building the at least one feature.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
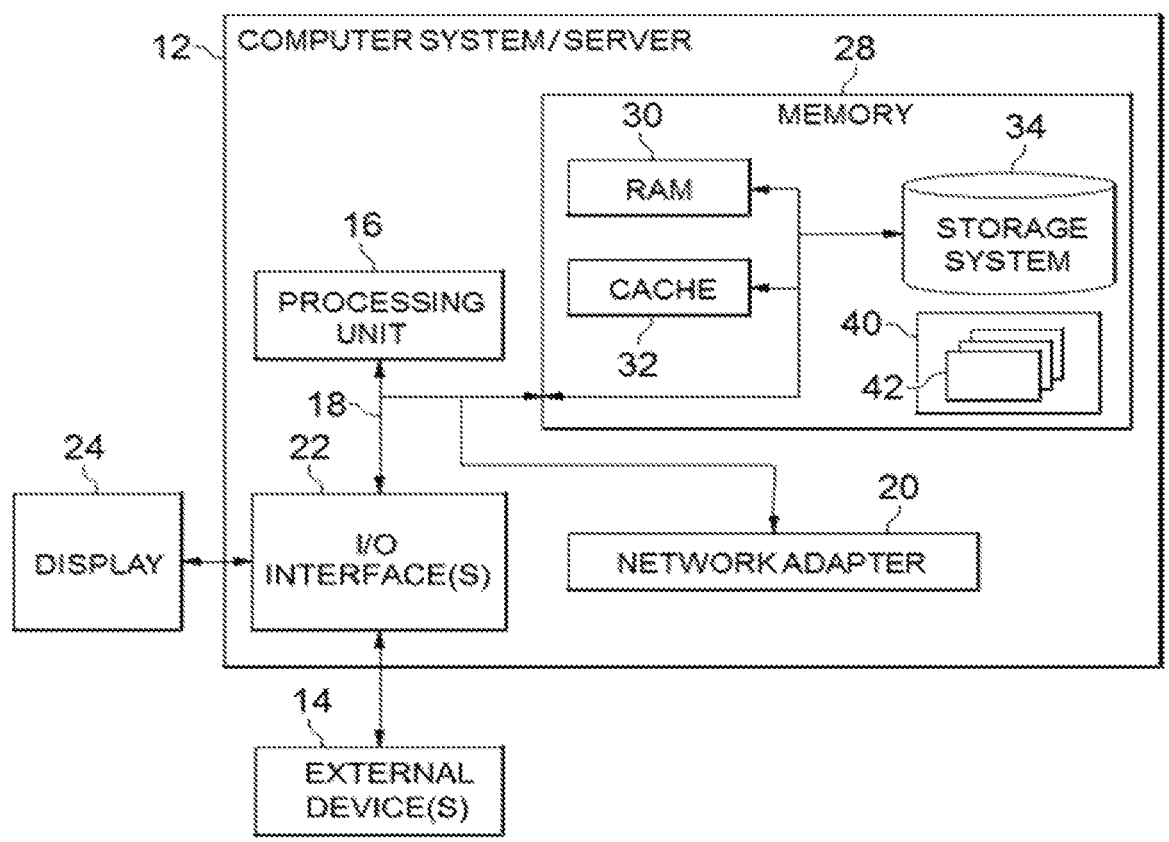
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to some embodiments of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of implementing and/or performing any of the functionality set forth herein.

In cloud computing node 10 there is a computer system/server 12, which can be a portable electronic device such as a communication device, and/or numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor bus or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product 40 having a set (e.g., at least one) of program modules 42 that are configured to carry out the functions of embodiments of the disclosure.

Program product 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, and a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
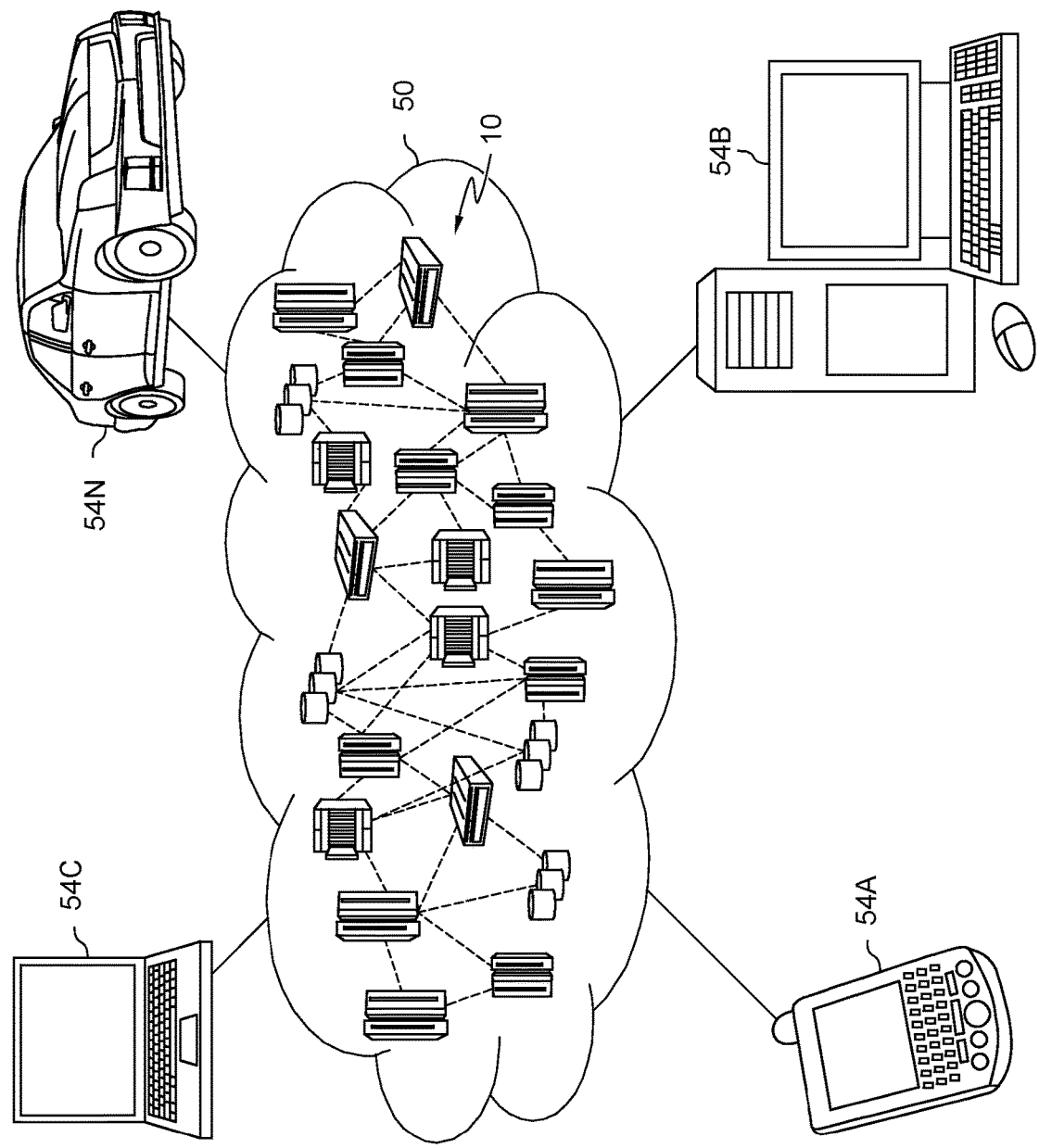
FIG. 2 depicts a cloud computing environment according to some embodiments of the present disclosure.

Referring now to FIG. 2, illustrative cloud computing environment 50 is depicted, according to some embodiments of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
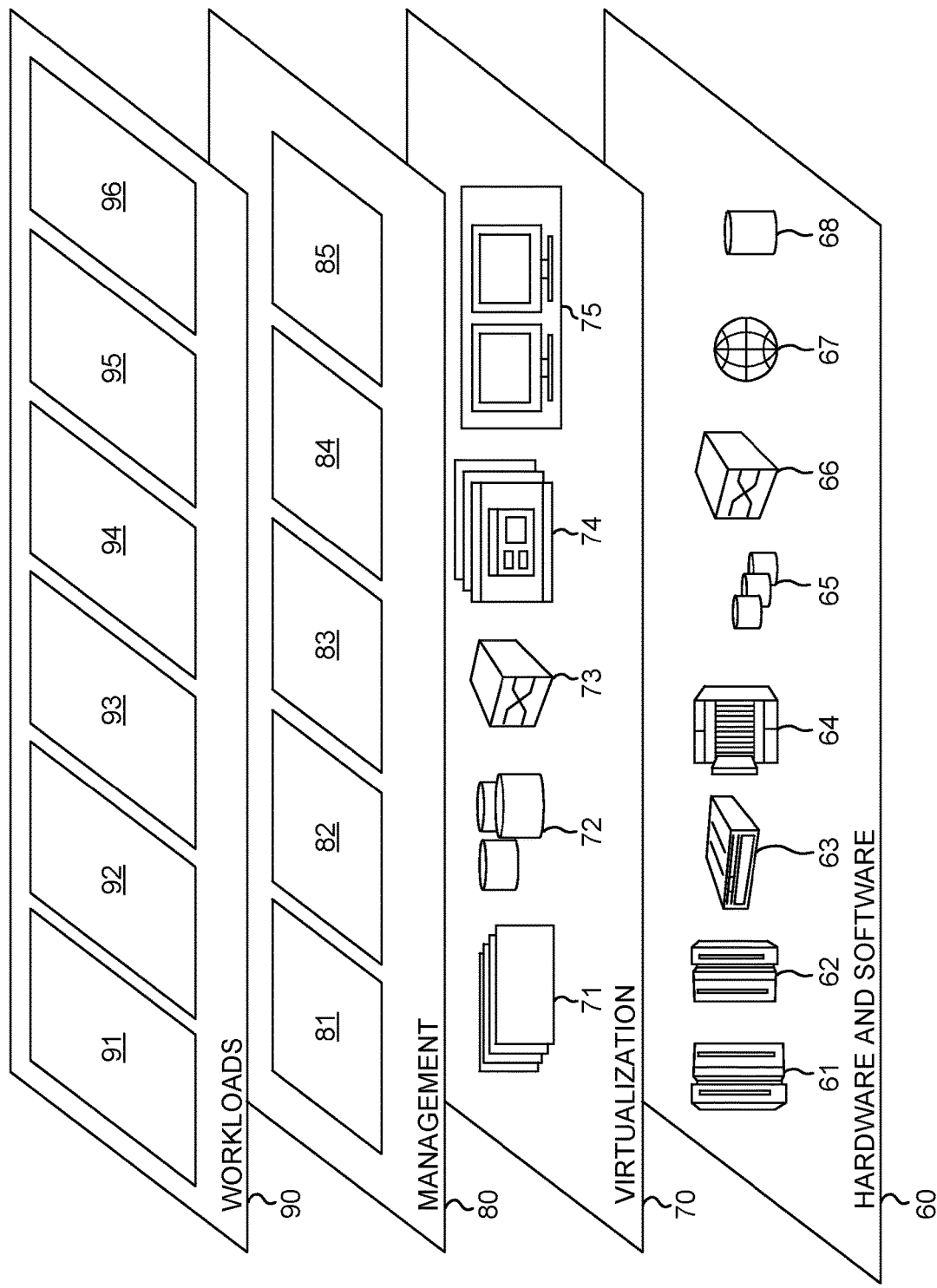
FIG. 3 depicts abstraction model layers according to some embodiments of the present disclosure.

Referring now to FIG. 3, a set of functional abstraction layers provided by cloud computing environment 50 (FIG. 2) is shown, according to some embodiments of the present disclosure. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application building 96.

Before an application feature is deployed to a distributed service platform, source codes of the application feature can be built in a building environment based on pre-download runtime building information. However, the pre-download runtime building information and runtime building information can be quite different because they are usually managed by different parties. Moreover, as the service model changes, a service provider may need to update their service more and more frequently. Software incompatibility may often occur after an application feature is deployed to one or more target nodes in the distributed service platform. Therefore, it is desirable to resolve software incompatibility in the distributed service platform.

According to embodiments of the present disclosure, a new solution is proposed to resolve software incompatibility in a distributed service platform. In a building environment, components for building an application feature can be obtained from the distributed service platform during the time the application feature is being built. The components in the present disclosure can refer to or comprise software libraries on which an application feature depends. Every time an application feature is deployed to the distributed service platform, runtime paths of components for executing functions of the application feature are recorded for future building the application feature. By this way, the building environment can acquire runtime building information for building the application feature. Software incompatibility can be avoided or greatly reduced after the application feature has been deployed to one or more target nodes in the distributed service platform.

Figure 4:
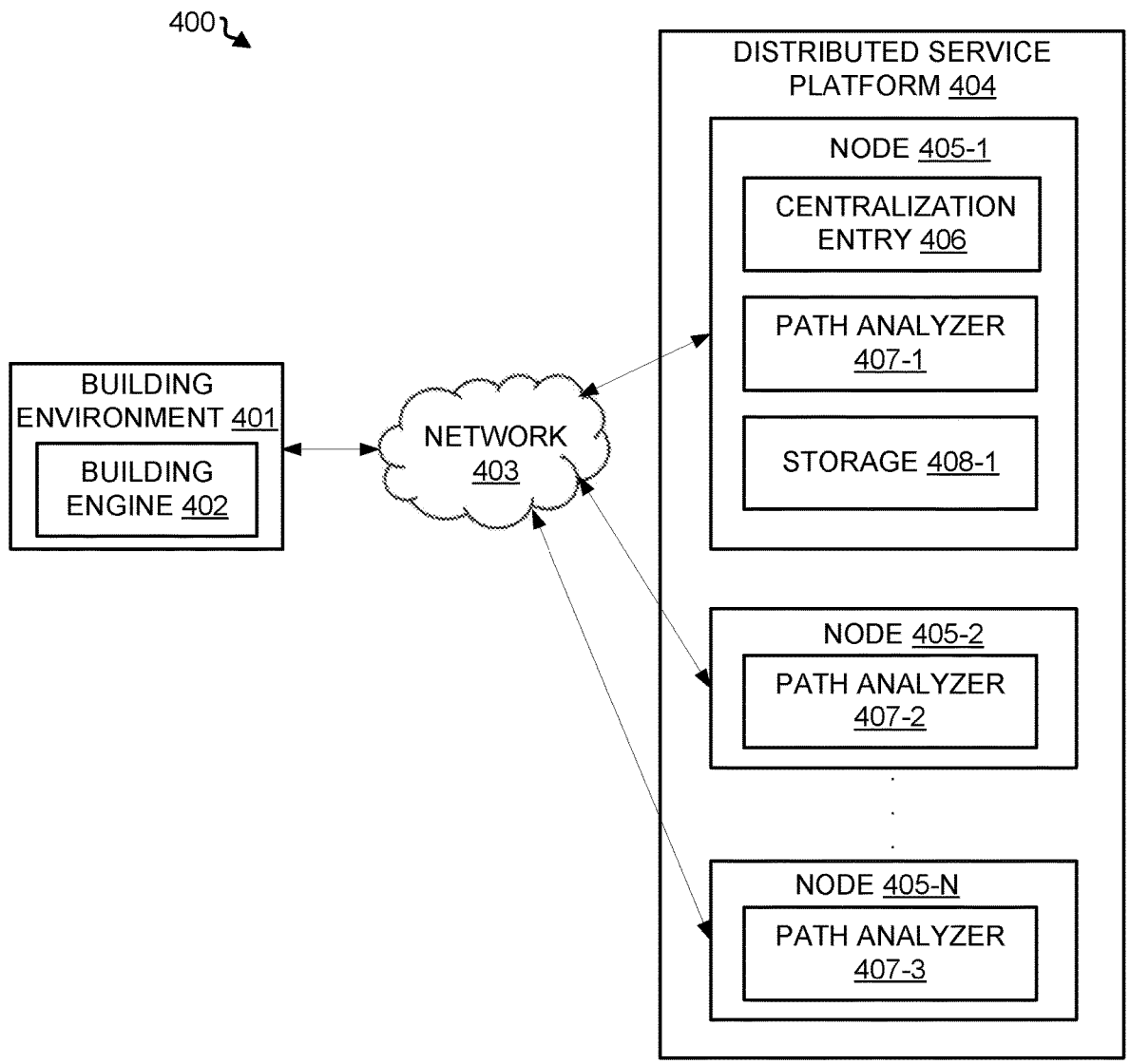
FIG. 4 depicts an architecture according to some embodiments of the present disclosure.

With reference now to FIG. 4, architecture 400 according to some embodiments of the present disclosure is depicted. Architecture 400 includes building environment 401 and distributed service platform 404. Building environment 401 can provide applications building for applications to be deployed to distributed service platform 404. Building environment 401 and distributed service platform 404 can communicate with each other over network 403. Building environment 401 includes building engine 402. Building engine 402 provides an application building which is a process of taking all source code files that make up an application and compiling them into build artifacts, such as binaries or executables. Distributed service platform 404 includes a plurality of nodes 405-1, 405-2, . . . 405-N (collectively referred to as "nodes 405" or individually referred to as "node 405"). Any number N of nodes 405 can be used in embodiments. Node 405-1 is depicted as a primary node and includes centralization entry 406, path analyzer 407-1 and storage 408-1. Nodes 405-2 through 405-N are depicted as secondary nodes and include path analyzer 407-2 . . . 407-N respectively. Building environment 401 can be implemented in a server. Nodes 405 can be implemented as a client/server architecture in which a more powerful node is assigned as a server and provides service and information to the other nodes considered as clients. In some embodiments, each of Nodes 405 can be consistent with Node 10 of FIGS. 1 and 2. The embodiments of the present disclosure will be described by referring to architecture 400 in FIG. 4.

Figure 5:
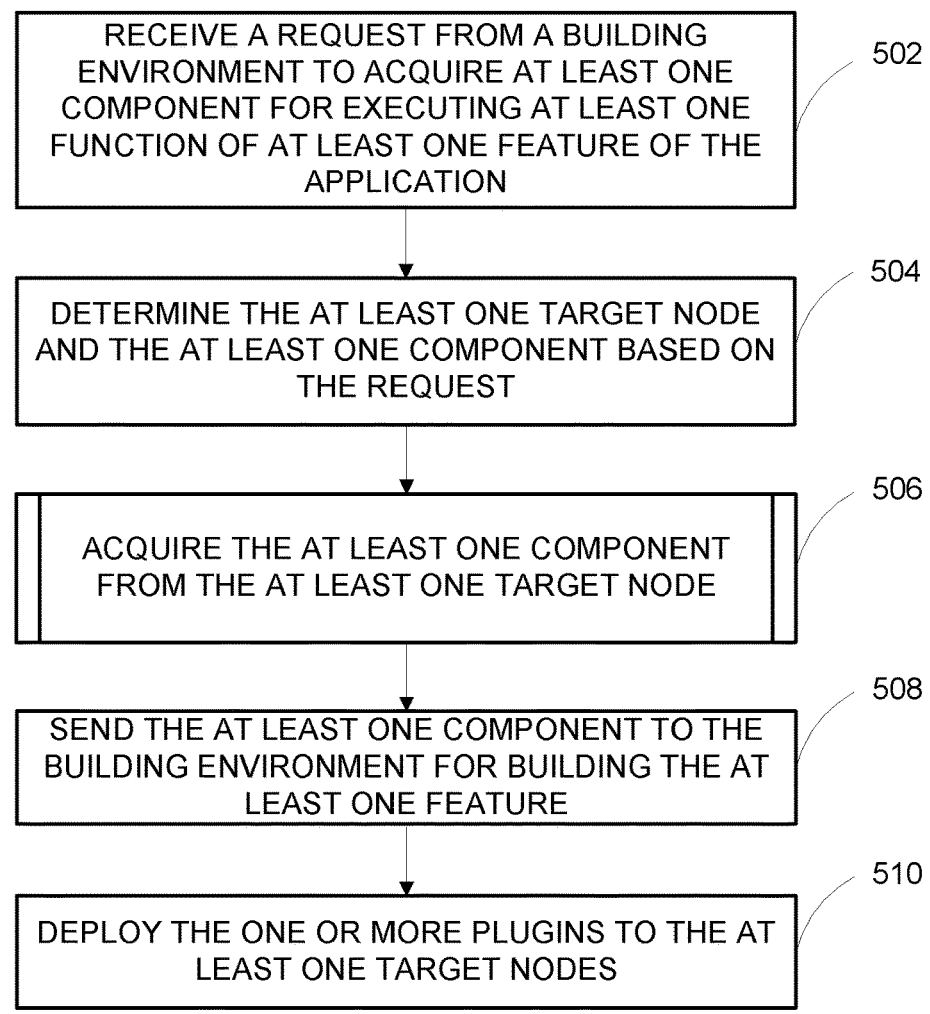
FIG. 5 depicts an example method for building an application according to some embodiments of the present disclosure.

FIG. 5 describes an example method 500 for building an application, according to some embodiments of the present disclosure. The method 500 can be implemented by centralization entry 406 in Node 405-1 of FIG. 4. Centralization entry 406 can provide centralized management and coordination for acquiring building information from nodes 405. The method 500 comprises operations 502 through 510. Method 500 can include more or fewer operations than those depicted. Method 500 can include operations in different orders than those depicted. Method 500 is described below with regard to architecture 400 of FIG. 4, but in other embodiments a different architecture may be used.

At 502, a request is received from a building environment to acquire at least one component for executing at least one function of at least one feature of the application. The at least one feature is to be deployed to at least one target node in a distributed service platform comprising a plurality of nodes. The request comprises building information related to the at least one feature generated by building engine 402 during a building process for the at least one feature. The building information includes identification information of the application, identification information of at least one function of the at least one feature, identification information of the at least one feature, identification information of the at least one component for executing the at least one function and identification information of at least one target node of the plurality of nodes where the at least one feature is to be deployed. The building information can be saved as meta data in a format of a file such as XML file, Json file or other predefined data structure. The following non-limiting example 1 shows example meta data in XML format. In example 1, the meta data includes an application identification (ID) "CICS V1.0.2", a feature ID "CICSplugin", function IDs "CMCIService" and "RESRService", component names "groovy.jar", "Java.jar" and "jetson.jar", and a target node ID "Server ID1". The metadata indicates that an application feature with the feature ID "CICSplugin" is to be deployed to a node with the server ID "Server ID1" in a distributed service platform. The application feature includes the functions with function IDs "CMCIService" and "RESRService". Three components named "groovy.jar", "Java.jar" and "jetson.jar" are components for executing the functions with function IDs "CMCIService" and "RESRService".

{Application ID: CICS V1.0.2}
{Feature ID: CICSplugin}
{Function ID: {CMCIService, RESRService}}

-continued

{Registered sever: {Server ID1}}
{Component name: {groovy.jar}, {Java.jar}, {jetson.jar}}

Example 1

At 504, the at least one target node and the at least one component are determined based on the request. Centralization entry 406 can extract the identification information of at least one target node and the building information related to the at least one feature from the request including identification information of the application, identification information of at least one function of the at least one feature and identification information of the at least one component for building the at least one function. The at least one target node and at least one component for building the at least one feature can be determined based on the identification information of at least one target node and the identification information of the at least one component for building the at least one function.

At 506, the at least one component is acquired from the at least one target node. An example process for acquiring the at least one component from the at least one target node is described in more detail in reference to FIG. 6.

At 508, the at least one component is sent to the building environment for building the at least one feature. After the at least one feature has been built, one or more plugins of the at least one feature can be sent to centralization entry 406 from building environment 401.

At 510, the one or more plugins can be deployed to the at least one target node in distributed service platform 404. After a plugin of an application feature has been deployed to a target node, centralization entry 406 may monitor the running of the application feature. After some time, there are some changes to the at least one runtime path of the at least one component. According to an embodiment, once the runtime paths of the at least one component are found to have changed, centralization entry 406 may trigger a path analyzer in the related node to record the most updated runtime paths of the at least one component. Then the runtime paths of the at least one component are replaced by the most updated ones. By this way, it can make sure the most updated components can be acquired from distributed service platform 404 for building the application feature in future. Therefore, software incompatibility can be avoided or greatly reduced after the application feature has been deployed to one or more target nodes.

Figure 6:
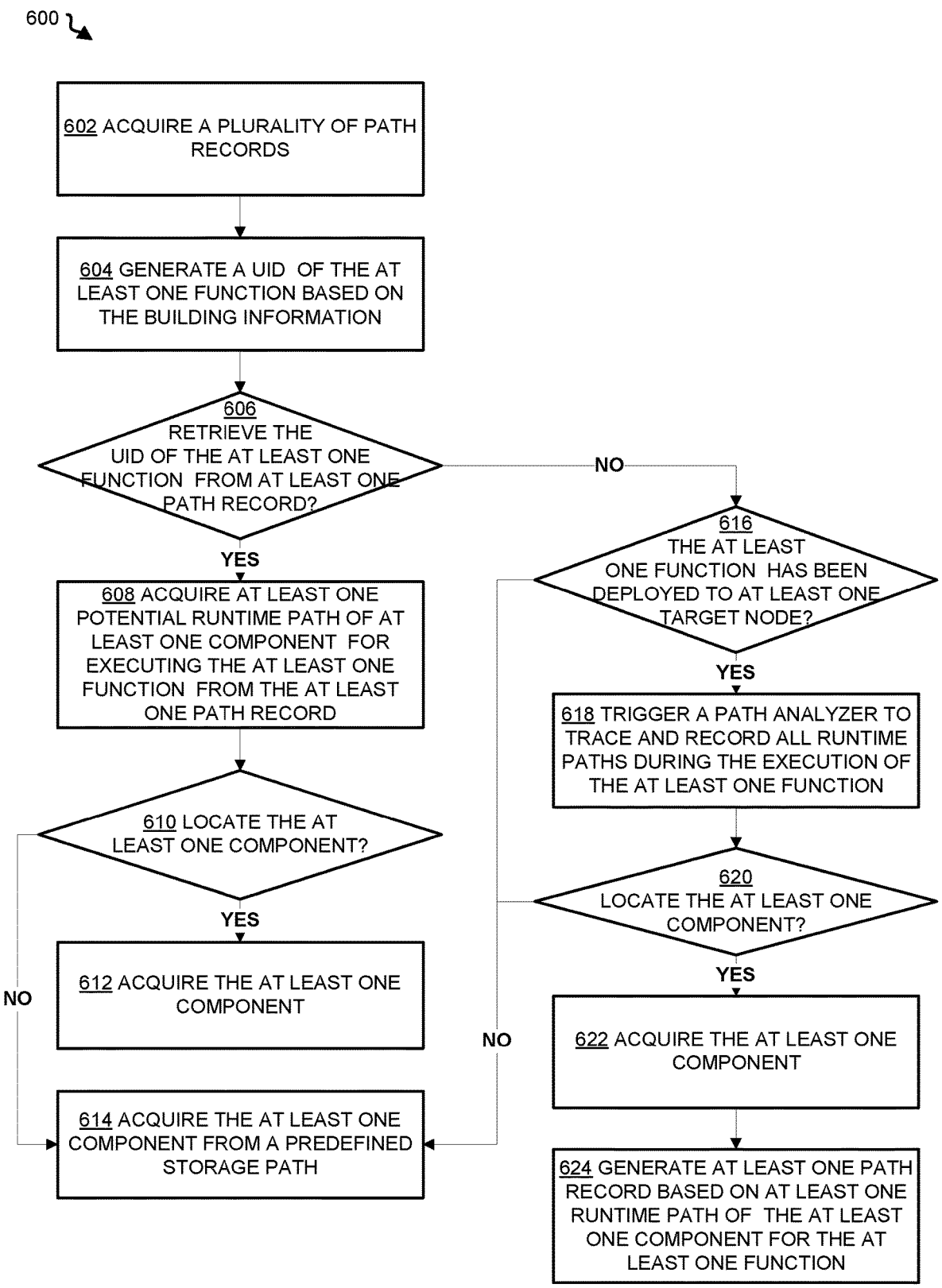
FIG. 6 depicts an example flow chart of a process for acquiring at least one component according to some embodiments of the present disclosure.

FIG. 6 depicts an example flowchart of process 600 for acquiring at least one component according to some embodiments of the present disclosure. The example flowchart of process 600 can be a subprocess of or provide further details for 506 of FIG. 5. Process 600 can include more or fewer operations than those depicted. Process 600 can include operations in different orders than those depicted. Process 600 is described below with regard to architecture 400 of FIG. 4, but in other embodiments a different architecture may be used.

At 602, a plurality of path records are acquired from storage 408-1 of FIG. 4. Each path record can include a unique identifier (UID) of a function of a feature of an application which has been deployed to the distributed service platform and at least one potential runtime path of at least one component for executing the function. The UID of the function can uniquely identify the function. The UID of the function can be generated based on the building information. According to an embodiment, the UID of a function may be a combination of identification information of the application, identification information of the feature, identification information of the function and identification information of corresponding at least one target node where the at least one feature has been deployed. Table 1 shows example a plurality of path records.

In Table 1, each path record includes a function UID and potential runtime paths of components. The function UID in path record 1 is a combination of an application ID "CICS V1.0.2", a feature ID "CICSPlugin", a function ID "CMCIService" and a node ID "Server ID1." The potential runtime paths of components in path record 1 is "/root/user/lib/groovy.jar" and "/root/user/UCDServer/lib/Java.jar". The function UID of path record 2 is a combination of an application ID "CICS V1.0.2," a feature ID "CICSPlugin," a function ID "RESRService," and a node ID "Server ID1". The potential runtime paths of components in path record 2 is "/root/user/lib/jetson.jar." The function UID of path record 3 is a combination of an application ID "CMC V2.0," a feature ID "CMCPlugin," a function ID "WLMService" and a node ID "Server ID2." The potential runtime paths of components in path record 3 is "/user/lpp/CMCplugin/log4j.jar." It can be understood by those skilled in the art, other algorithms can be adopted to generate a UID of a function based on the building information as long as other algorithms can make sure the generated UID of the function is unique.

TABLE 1

| Path records | Function UID | Potential runtime path of components |
|---|---|---|
| 1 | CICSV1.0.2CICSPluginCMCIServiceServerID1 | /root/user/lib/groovy.jar; /root/user/UCDServer/lib/Java.jar |
| 2 | CICSV1.0.2CICSPluginRESRServiceServerID1 | /root/user/lib/jetson.jar |
| 3 | CMCV2.0CMCPluginWLMServiceServerID2 | /user/lpp/CMCplugin/log4j.jar |
| . . . | . . . | . . . |

At 604, a UID of the at least one function is generated based on the building information. By way of example, the application ID "CICS V1.0.2," the feature ID "CICSPlugin," the function ID "CMCIService," and the Node ID "Server ID 1" can be acquired from the building information in above Example 1. According to an embodiment, the UID of the function "CMCIService" is a combination of the application ID "CICS V1.0.2," the feature ID "CICSPlugin," the function ID "CMCIService," and the Node ID "Server ID 1." That is, the UID of the function "CMCIService" is "CICSV1.0.2CICSPluginCMCIServiceServerID1" in this example. This is only one example of UID of the function and is not intended to suggest any limitation as to the scope of use or functionality of embodiments of the present disclosure described herein.

At 606, it is determined whether the UID of the at least one function of the at least one feature can be retrieved from at least one path record in the plurality of path records. The plurality of path records can be searched for the UID of at least one function. By way of example, the UID of the function "CMCIService" "CICSV1.0.2CICSPluginCMCIServiceServerID1" can be used as key words to search the plurality of path records in Table 1. As a result, the key words can be found in path record 1. If the determination result is YES, then at 608, at least one potential runtime path of the at least one component for executing the at least one function is acquired from the at least one path record. By way of example, two potential runtime paths "/root/user/lib/groovy.jar" and "/root/user/UCDServer/lib/Java.jar" can be acquired from path record 1. If the determination result is NO, process 600 continues to operation 616 discussed below.

At 610, it is determined whether the at least one component can be located under the at least one potential runtime path. According to an embodiment, the at least one component name can be acquired from the identification information of the at least one component extracted from the building information. It can be understood by those skilled in the art, a find command can be used to search through all directories and subdirectories under the at least one potential runtime path for the at least one component name.

If the at least one component name can be located under the at least one potential runtime path, then at 612, the at least one component can be acquired based on the at least one potential runtime path. According to an embodiment, if the target node is a primary node Node 406-1, centralization entry 406 can acquire the at least one component from the at least one potential runtime path directly. According to an embodiment, if the target node is one of the secondary nodes, centralization entry 406 can instruct the target node to acquire the at least one component from the at least one potential runtime path. Then, the target node can send the at least one component back to centralization entry 406. According to another embodiment, if the target node is one of the secondary nodes, centralization entry 406 can acquire the at least one component from the at least one potential runtime path directly using a remote login protocol and secure copy (remote file copy program). If the at least one component name cannot be located under the at least one potential runtime path, then the process 600 goes to 614, and the at least one component can be acquired from a predefined storage path.

At 606, if the determination result is NO, then at 616, it is determined whether the at least one function has been deployed to the at least one target node. Centralization entry 406 can instruct the at least one target node to execute the at least one function. If the at least one function cannot be executed on the at least one target node, it indicates that the at least one function has not been deployed to the at least one target node. Then the process goes to 614, and the at least one component can be acquired from a predefined storage path as above. If the at least one function can be executed on the at least one target node, it indicates that the at least one function has been deployed to the at least one target node.

At 618, a path analyzer in the at least one target node is triggered by centralization entry 406 to trace and record all runtime paths during the execution of the at least one function. It can be understood by those skilled in the art that a path analyzer can monitor multiple processes during the execution of a function. All runtime paths of the multiple processes for the at least one function can be traced and recorded by the path analyzer during an execution of the at least one function in the at least one target node.

At 620, it is determined whether the at least one component for executing the at least one function can be located under at least one runtime path of the all runtime paths. As described at 504, the at least one component name can be acquired from the identification information of the at least one component extracted from the building information. According to an embodiment, a find command can be used to check if the at least one component can be located in all directories and subdirectories under the all runtime paths. If the at least one component can be located, then at 622, the at least one component can be acquired based on the at least one potential runtime path. The implementation of acquiring the at least one component may be the same as that discussed above with regard to operation 612. If the at least one component cannot be located, then the at least one component can be acquired from a predefined storage path at 614.

At 624, at least one path record can be generated based on at least one runtime path of the at least one component. As described at 602, each path record includes a UID of a function of an application feature which has been deployed and at least one potential runtime path of at least one component for executing the function. Table 1 includes a plurality of example path records. These path records can be saved into storage 408-1 by centralization entry 406 for future application building. Some changes may happen to the at least one component under the at least one runtime path after some time. For example, some components may be deleted, and some components may be changed to other components. As such, it is possible that the at least one component is not available under the at least one runtime path for future building. From the point of view of future, the at least one runtime path of the at least one component is a set of potential runtime path from which the at least one component is possible to be acquired.

It should be noted that the processing of an application building in a distributed computing environment according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A computer-implemented method for building an application comprising:

receiving, by one or more processing units, a request from a building environment to acquire at least one component for executing at least one function of at least one feature of the application, wherein the at least one feature is to be deployed to at least one target node in a distributed service platform comprising a plurality of nodes, wherein the request comprises building information related to the at least one feature and the building information includes identification information of the application, identification information of the at least one feature, identification information of the at least one function of the at least one feature, identification information of the at least one component for executing the at least one function, and identification information of the at least one target node;

determining, by the one or more processing units, the at least one target node and the at least one component based on the request;

acquiring, by the one or more processing units, the at least one component from the at least one target node, wherein the acquiring the at least one component from the at least one target node comprises:

acquiring, by the one or more processing units, a plurality of path records, each respective path record of the plurality of path records including a respective unique identifier (UID) of a respective function of a respective feature of the application and at least one potential runtime path of the at least one component for executing the respective function;

generating a UID of the at least one function based on the building information; and searching, by the one or more processing units, the UID of the at least one function in the plurality of path records; and sending, by the one or more processing units, the at least one component to the building environment for building the at least one feature.

2. The method of claim 1, wherein the acquiring the at least one component from the at least one target node further comprises:

acquiring, by the one or more processing units, at least one potential runtime path of the at least one component from at least one path record of the plurality of path records in response to the UID of the at least one function being retrieved from the at least one path record; and acquiring, by the one or more processing units, the at least one component from the at least one target node in response to the at least one component being located under the at least one potential runtime path in the at least one target node.

3. The method of claim 1, further comprising:

acquiring, by the one or more processing units, at least one potential runtime path of the at least one component from at least one path record of the plurality of path records in response to the UID of the at least one function being retrieved from the at least one path record; and acquiring, by the one or more processing units, the at least one component from a predefined storage path in response to the at least one component not being located under the at least one potential runtime path in the at least one target node.

4. The method of claim 1, wherein the acquiring the at least one component from the at least one target node comprises:

determining, by the one or more processing units and in response to the UID of the at least one function not being retrieved from the plurality of path records, that the at least one function has been deployed in the at least one target node;

triggering, by the one or more processing units and in response to determining that the at least one function has been deployed in the at least one target node, a path analyzer in the at least one target node to trace and record all runtime paths of at least one process during an execution of the at least one function; and acquiring, by the one or more processing units, the at least one component.

5. The method of claim 4, further comprising:

generating, by the one or more processing units, at least one path record based on at least one runtime path of the recorded runtime paths, each of the at least one path record including the UID of the at least one function and the at least one runtime path of the at least one component.

6. The method of claim 4, wherein the acquiring the at least one component further comprises:

acquiring, by the one or more processing units, the at least one component from a predefined storage path in response to the at least one component being not located under the all runtime paths in the at least one target node.

7. A computer-implemented system for building an application comprising:

one or more processors; and a memory communicatively coupled to the one or more processors, wherein the memory comprises instructions which, when executed by the one or more processors, cause the one or more processors to perform a method comprising:

receiving a request from a building environment to acquire at least one component for executing at least one function of at least one feature of the application, wherein the request comprises building information related to the at least one feature and the at least one feature is to be deployed to at least one target node in a distributed service platform comprising a plurality of nodes;

determining the at least one target node and the at least one component based on the request;

acquiring the at least one component from the at least one target node, wherein the acquiring the at least one component from the at least one target node comprises:

acquiring, by the one or more processors, a plurality of path records, each respective path record of the plurality of path records including a respective unique identifier (UID) of a respective function of a respective feature of the application and at least one potential runtime path of the at least one component for executing the respective function;

generating a UID of the at least one function based on the building information; and searching, by the one or more processors, the UID of the at least one function in the plurality of path records; and sending the at least one component to the building environment for building the at least one feature.

8. The system of claim 7, wherein the acquiring the at least one component from the at least one target node further comprises:

acquiring at least one potential runtime path of the at least one component from at least one path record of the plurality of path records in response to the UID of the at least one function being retrieved from the at least one path record; and acquiring the at least one component from the at least one target node in response to the at least one component being located under the at least one potential runtime path in the at least one target node.

9. The system of claim 7, the method further comprising:

acquiring, by the one or more processors, at least one potential runtime path of the at least one component from at least one path record of the plurality of path records in response to the UID of the at least one function being retrieved from the at least one path record; and acquiring the at least one component from a predefined storage path in response to the at least one component not being located under the at least one potential runtime path in the at least one target node.

10. The system of claim 7, wherein the acquiring the at least one component from the at least one target node comprises:

determining, in response to the UID of the at least one function not being retrieved from the plurality of path records, whether the at least one function has been deployed in the at least one target node;

triggering, in response to a determination that the at least one function has been deployed in the at least one target node, a path analyzer in the at least one target node to trace and record all runtime paths of at least one process during an execution of the at least one function; and acquiring the at least one component.

11. The system of claim 10, the method further comprising:

generating at least one path record based on at least one runtime path of the recorded runtime paths, each of the at least one path record including the UID of the at least one function and the at least one runtime path of the at least one component.

12. A computer program product for building an application, the computer program product comprising a computer readable storage medium having program instructions embodied therewith, wherein the computer readable storage medium is not a transitory signal per se, the program instructions executable by a compute, including one or more processors, to perform a method comprising:

receiving a request from a building environment to acquire at least one component for executing at least one function of at least one feature of the application, the at least one feature being to be deployed to at least one target node in a distributed service platform comprising a plurality of nodes, wherein the request comprises building information related to the at least one feature;

determining the at least one target node and the at least one component based on the request;

acquiring the at least one component from the at least one target node, wherein the acquiring the at least one component from the at least one target node comprises:
  acquiring, by the one or more processors, a plurality of path records, each respective path record of the plurality of path records including a respective unique identifier (UID) of a respective function of a respective feature of the application and at least one potential runtime path of the at least one component for executing the respective function;
  generating a UID of the at least one function based on the building information; and
  searching, by the one or more processors, the UID of the at least one function in the plurality of path records; and
sending the at least one component to the building environment for building the at least one feature.

13. The computer program product of claim 12, wherein the acquiring the at least one component from the at least one target node further comprises:
  acquiring at least one potential runtime path of the at least one component from at least one path record of the plurality of path records in response to the UID of the at least one function of the at least one feature being retrieved from the at least one path record; and
  acquiring the at least one component from the at least one target node in response to the at least one component being located under the at least one potential runtime path in the at least one target node.

* * * * *